United States Patent Office 3,413,676
Patented Dec. 3, 1968

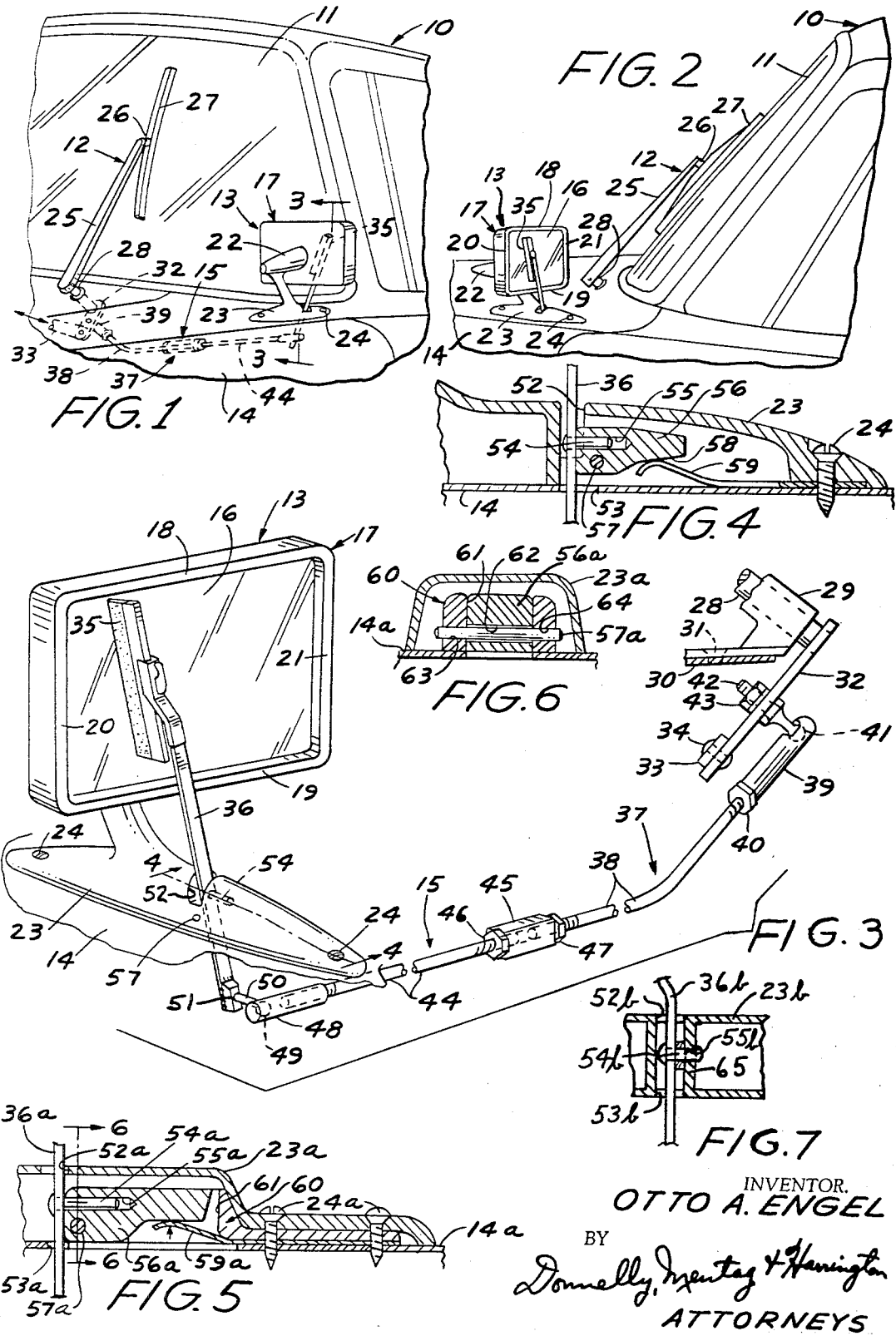

3,413,676
REAR VIEW MIRROR WIPER ASSEMBLY
Otto A. Engel, 8086 Westwood St., Detroit, Mich. 48228
Filed May 19, 1967, Ser. No. 639,729
7 Claims. (Cl. 15—250.27)

ABSTRACT OF THE DISCLOSURE

A wiper apparatus for a vehicle rear view mirror mounted on a vehicle fender, and including a rear view mirror wiper which is mounted on an arm for movement over the surface of the rear view mirror. The rear view mirror wiper arm is normally biased toward the rear view mirror. The rear view mirror wiper arm is oscillated backwardly and forwardly to move the wiper over the rear view mirror by means of a driving arm that is hingedly connected at one end thereof to the rear view mirror wiper arm and at the other end thereof to a plate attached to the oscillating shaft on which the regular vehicle windshield wiper is mounted.

This invention relates generally to the vehicle rear view mirror art, and more particularly to a novel and improved wiper apparatus for rear view mirrors mounted on the front fenders of the vehicle.

The rear view mirrors on many of the present automobiles, trucks and other vehicles are mounted on the fenders in a position forwardly beyond the arm reach of the driver when he is in the driver's seat. Accordingly, if the rear view mirror or mirrors become fogged or covered with rain or the like, it is impossible while the vehicle is traveling to clean such mirror or mirrors, and they become useless and this situation is dangerous and creates a safety problem. The problem of providing a clean rear view mirror under rainy and foggy conditions has been partially solved or overcome by applicant's improved wiper apparatus as shown and described in applicant's copending United States application Ser. No. 455,461, filed May 13, 1965, entitled "Rear View Mirror Wiper," and now Patent No. 3,320,627. The wiper apparatus shown and described in said copending application, however, is not capable of functioning on a vehicle wherein the usual windshield wiper is recessed when it is not being operated. Accordingly, it is an important object of the present invention to provide a novel and improved wiper apparatus for a rear view mirror mounted on a fender of a vehicle for wiping away rain and fog.

It is another object of the present invention to provide a novel and improved wiper apparatus for a fender mounted vehicle rear view mirror which may be operated by the usual windshield wiper on the adjacent side of the vehicle, and which may be quickly and easily attached to the regular windshield wiper and operated therewith.

It is a further object of the present invention to provide a novel and improved wiper apparatus for a vehicle rear view mirror mounted on a fender of a vehicle and which includes a wiper for the rear view mirror which may be operated by the usual wiper of the vehicle which is normally recessed and out of sight when the usual windshield wiper is inoperative.

It is still another object of the present invention to provide a novel and improved fender mounted vehicle rear view mirror wiper apparatus which is simple and compact in construction, economical to manufacture, and efficient in operation.

It is still another object of the invention to provide a wiper apparatus for a vehicle rear view mirror mounted on a vehicle fender including a rear view mirror wiper mounted on an arm for movement over the surface of the rear view mirror, said wiper arm being normally biased toward the rear view mirror to maintain the rear view mirror wiper in an operative engagement with the surface of the rear view mirror, and a driving arm hingedly connected at one end thereof to the lower end of the rear view mirror wiper arm and at the other end thereof to a plate attached to the oscillating shaft on which the regular vehicle windshield wiper is mounted.

Other objects, features and advantages of this invention will be apparent from the following detailed description, appended claims, and the accompanying drawing.

In the drawing:

FIG. 1 is a fragmentary, perspective view of the left front portion of the windshield of a conventional vehicle, showing the usual windshield wiper, a rear view mirror on the left front fender, and a rear view mirror wiping apparatus made in accordance with the principles of the present invention;

FIG. 2 is a fragmentary, perspective view of the vehicle structure illustrated in FIG. 1, taken from the right side of the vehicle structure as viewed in FIG. 1;

FIG. 3 is an enlarged, fragmentary, elevational section view of the vehicle structure of FIG. 1 on which the conventional windshield wiper and rear view mirror are mounted, and showing a first illustrative embodiment of a rear view mirror wiper apparatus made in accordance with the principles of the present invention;

FIG. 4 is an enlarged, fragmentary, elevational section view of the rear view mirror stand structure illustrated in FIG. 3, taken along the line 4—4 thereof, and looking in the direction of the arrows;

FIG. 5 is an elevational section view, similar to FIG. 4, of a second illustrative embodiment of the invention;

FIG. 6 is an elevational section view of the structure illustrated in FIG. 5, taken along the line 6—6 thereof, and looking in the direction of the arrows; and, FIG. 7 is an elevational section view, similar to FIG. 4, of a third illustrative embodiment of the invention.

Referring now to the drawing, and in particular to FIGS. 1 and 2, the numeral 10 generally designates a conventional passenger automobile which is provided with a rear view mirror wiper system made in accordance with the principles of the present invention. The numeral 11 indicates the windshield of the vehicle and the numeral 12 generally designates a conventional windshield wiper apparatus disposed on the left side or driver side of the vehicle 10.

A rear view mirror is generally indicated by the numeral 13 and it is shown as being mounted on the left front fender 14 in a position beyond the reach of the driver of the vehicle so that it cannot be cleaned by the driver while the vehicle is in motion. The numeral 15 generally designates a first illustrative embodiment of the rear view mirror wiper system or apparatus of the present invention.

As best seen in FIG. 3, the illustrative rear view mirror 13 is of conventional construction and comprises the elongated mirror 16 which is rectangular in plan configuration and positioned with the longer axis disposed horizontally. The mirror 16 is secured in a suitable housing which is generally indicated by the numeral 17. The front edges of the housing 17 are folded over in a conventional manner against the mirror 16 so as to retain it in the housing. The folded-over housing edges form the spaced apart horizontal flanges 18 and 19, and the spaced apart vertical flanges 20 and 21, which are disposed about the periphery of the mirror 16. As shown in FIG. 1, the mirror housing 17 is swivelly connected in a conventional manner by a pivot structure 22 to the upper end of the mounting stand 23 which is secured to the fender 14 of the vehicle 10 by any suitable means, as by the screws 24.

As shown in FIG. 1, the vehicle 10 is provided with the usual windshield wiper apparatus 12 in front of the driver's position on the left-hand side of the vehicle. The usual or conventional wiper 12 comprises the arm 25, to the upper end of which is fixed the connection means 26 for connecting the arm 25 to a conventional windshield wiper blade 27. The wiper arm 25 is fixed to the outer end of a windshield wiper drive shaft 28 which is oscillated by the usual vacuum motor or electric motor drive means to move the wiper blade 27 across the surface of the windshield 11 in the usual arcuate wiping path. The drive means for the shaft 28 is not shown since it does not form a part of the invention and the shaft 28 can be rotated as stated hereinbefore by the usual windshield wiper motor means.

In some of the present automobiles, the usual windshield wipers are disposed in a recessed position below the lower end of the windshield when they are inactive so that they are not visible. A recess is formed along the bottom of the windshield and the usual wiper arm and wiper blade is seated in said recess when the wiper is inactive. Accordingly, with such a recessed wiper system, the rear view mirror wiper apparatus disclosed in the aforementioned copending application cannot be used and the wiper apparatus of the present invention may be employed.

As shown in FIG. 1, the usual windshield wiper driving shaft 28 is mounted in a fixed journal below the hood of the vehicle 10. As shown in FIG. 3, the shaft 28 is journaled in a suitable supporting housing 29 that is fixed to a frame portion 30 of the vehicle 10 by any suitable means, as by the screws 31. Fixed to the inner end of the driving shaft 28 is a drive lever 32 which is oscillated by means of the lever 33 which is hinged to the lower end of the drive lever 32 by a suitable hinge pin 34. In the usual or conventional windshield wiper systems, the lever 33 is connected to the other windshield wiper shaft on the right side of the vehicle by a similar lever 32. The usual electric or vacuum motor drive means then is operatively connected to either one of the shafts 28 or to the inner connecting arm 33.

The first illustrative embodiment of the present invention is operatively connected to the aforementioned conventional windshield wiper system at a point below the hood of the vehicle 10 and below the fender of the vehicle, whereby the illustrative rear view mirror wiper apparatus may be employed with a conventional recessed windshield wiper system or a conventional windshield wiper system which is not recessed when it is inactive.

The first illustrative embodimnet of the present invention is illustrated in detail in FIGS. 3 and 4. The rear view mirror wiper apparatus of FIGS. 1 through 4 includes the wiper blade 35 which is mounted on the wiper blade arm 36. The wiper blade 35 and wiper blade arm 36 may be of conventional construction with the arm 36 being made of stiff steel, although as described hereinafter in another embodiment the arm 36 may be made of spring steel, if desired. As shown in FIG. 3, the wiper blade arm 36 is interconnected with the lever 32 by a driving arm generally indicated by the numeral 37. The driving arm 37 includes a first portion made from a rod 38 which is threaded at each end thereof and which has one of the threaded ends threaded into the ball-type connection joint member 39. A lock nut 40 is adapted to fix said one end of the rod 38 in an adjusted position in the connection joint member 39. The connection joint member 39 is provided with a suitable socket on the outer end thereof in which is operatively journaled a ball joint member 41 to which is integrally attached a threaded connection shaft 42. The shaft 42 extends through a suitable hole in the lever 32 at an intermediate position in this lever. The shaft 42 is secured to the lever 32 by the lock nut 43.

The driving arm 37 includes a second rod portion 44 which is also threaded at each end thereof. As shown in FIG. 3, the adjacent threaded ends of the rods 38 and 44 are threadably mounted in a suitable threaded bore in a connection block 45. The rods 38 and 44 are fixed to the connection block 45 in a suitable adjusted position by the lock nuts 46 and 47. It will be seen that the effective over-all length of the driving arm 37 can thus be increased or decreased by threading the rods 38 and 44 inwardly and outwardly of the connection block 45. The other end of the rod 44 is threadably mounted in a ball-type connection joint member 48 which is similar to the connection joint member 39 and which also carries a ball joint member 49. The ball joint member 49 has integrally connected thereto a shaft 50 which is fixed to a block 51 that is secured to the lower end of the wiper arm 36 by any suitable means, as by welding or brazing.

As shown in FIGS. 3 and 4, the wiper arm 36 is vertically disposed for oscillating movement in a vertical plane. The wiper arm 36 extends downwardly through the opening 52 in the rear view mirror stand 23 and also through the opening 53 formed in the vehicle fender 14. The wiper arm 36 is pivotally mounted on the rear view mirror wiper stand 23 by the following described structure. As best seen in FIG. 4, the wiper arm 36 is pivoted at a point spaced upwardly from the lower end of the wiper arm by a pivot pin 54 which is fixed in the bore 55 by any suitable means, as by a press-fit. The outer end of the pivot pin 54 is enlarged or peened over so as to retain the wiper arm 36 thereon but permit free rotation of the wiper arm on the pivot pin 54. The bore 55 is formed in a pivot block 56 which is disposed within the hollow interior of the rear view mirror housing or mounting stand 23.

The pivot block 56 is pivotally mounted at the front end thereof on the pivot pin or shaft 57 which has its outer ends fixed in the wall portions of the rear view mirror mounting stand 23. The pivot pin 57 is located at a point near the front end of the pivot block 56, and below the pivot pin 54 which carries the wiper arm 36. The pivot block 56 is adapted to be normally biased in a counterclockwise direction as viewed in FIG. 4 so as to normally bias the wiper arm 36 to the left or forwardly so as to maintain the wiper blade 35 in engagement with the mirror 16. The pivot block 56 is provided with a normal counter-clockwise bias by any suitable spring means, as for example, the leaf spring 59 which has the front end thereof in engagement with the lower surface 58 of the pivot block 56 and the rear end thereof secured to the fender 14 by the mounting stand 23 and the screw 24.

In use, when the regular or conventional windshield wiper apparatus 12 is operated, the auxiliary or supplementary windshield wiper apparatus for the rear view mirror will be operated so as to clean the rear view mirror 16. The driver of the vehicle is thus provided with clear vision to the rear view mirror 16 so as to enable him to employ the rear view mirror in the usual manner regardless of any foggy or rainy weather conditions. It will be understood that other suitable joint structures can be used for connecting the driving arm 37 to the lever 32 and the wiper arm 36. It will also be understood that the driving arm 37 may be made from any other suitable structure than that shown, as for example, it may be made from a flexible cable. It will be understood, that a second similarly constructed rear view mirror wiper apparatus may also be mounted on the right side of the vehicle for operation by the windshield wiper on the right side of the vehicle 10. Actual experience has shown that the rear view wiper apparatus of the present invention is a simple and economical safety apparatus which provides a vehicle driver with clear rear view mirror vision, regardless of the fog or rain outside of the vehicle, and which enables the driver to more safely guide his vehicle through such inclement weather.

FIGS. 5 and 6 illustrate a second illustrative embodiment of the invention in which the same reference numerals, followed by the small letter "a," have been used to indicate the parts which correspond to the structure of the first embodiment. In the embodiment of FIGS. 5 and 6, the pivot means for normally biasing the wiper arm 36a forwardly so as to maintain the wiper blade 35 against the mirror 16 has been slightly modified. In the first embodiment, the pivot block 56 was pivotally mounted directly to the rear view mirror mounting stand 23, but in the embodiment of FIGS. 5 and 6, the pivot block 56a is shown as being hingedly mounted in a separate pivot housing generally indicated by the numeral 60. As shown in FIG. 5, the rear end of the pivot housing 60 is reduced and is provided with an extension which is secured to the fender 14a by the coaction of the mounting stand 23a and the screws 24a.

As shown in FIGS. 5 and 6, the pivot housing 60 is provided with an elongated recess 61 that extends inwardly from the front end thereof. The pivot block 56a is disposed within the recess 61 and is pivoted at the forward end thereof by the pivot pin 57a which extends through the bore 62 in the pivot block 56a, and through the bores 63 and 64 in the pivot housing 60. The pin 57 would be secured in place by any suitable means as by a press-fit, and the bore 62 would be sufficiently large so as to provide free pivotal movement of the pivot block 56a about the hinge pin 57a. The pivot block 56a is provided with a normal counter-clockwise bias as viewed in FIG. 5, by any suitable means, as by the leaf spring 59a. The embodiment of FIGS. 5 and 6 would function in the same manner as the first described embodiment of FIGS. 1 through 4.

FIG. 7 illustrates a third illustrative embodiment of the invention in which the parts that are the same as the parts of the first embodiment of FIGS. 1 through 4 have been marked with the same reference numerals followed by the small letter "b." In this embodiment, the wiper arm 36b is made from a spring material and is provided with an inherent forward bias because of its spring steel construction so as to normally bias the wiper blade 35 into wiping engagement with the mirror 16 without the necessity of the employing of the pivot block 56 and the spring 59. In this embodiment, the spring steel wiper arm 36b is pivotally mounted in the same manner as the other embodiments. The wiper arm 36b is pivotally mounted on the hinge pin 54b which is fixed in a suitable bore 55b formed in the transverse wall 65 that is integrally formed in the rear view mirror mounting stand 23b. The embodiment of FIG. 7 would function in the same manner as the afore-described embodiment of FIGS. 1 through 4.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What I claim is:

1. In a wiper apparatus for a vehicle rear view mirror mounted on a vehicle fender, for attachment to the oscillating operating lever for the shaft of a vehicle windshield wiper adjacent said fender which is located inside the vehicle hood, the combination comprising:
   (a) a rear view mirror wiper arm carrying a wiper blade for wiping engagement with the rear view mirror;
   (b) a driving arm interconnecting said wiper arm with said operating lever;
   (c) means hingedly connecting one end of said driving arm to said operating lever;
   (d) means pivotally mounting said rear view mirror wiper arm on the vehicle fender; and
   (e) means hingedly connecting the other end of said driving arm to said rear view mirror wiping arm, whereby when the vehicle windshield wiper adjacent said fender is actuated, the rear view mirror wiper blade will be actuated over the rear view mirror in an arcuate back-and-forth cleaning movement.

2. The wiper apparatus as defined in claim 1, wherein:
   (a) said rear view mirror wiper blade arm is extended through the fender and said driving arm is disposed inside of the body of the vehicle.

3. The wiper apparatus as defined in claim 1, wherein:
   (a) said rear view mirror is attached to the vehicle fender by a mounting stand;
   (b) said wiper arm extends down through said mounting stand; and,
   (c) said means pivotally mounting said rear view mirror wiper arm includes means for pivotally mounting the wiper arm on the mounting stand.

4. The wiper apparatus as defined in claim 3, wherein said means for pivotally mounting said wiper arm on mounting stand includes:
   (a) a hinge pin for pivotally mounting said wiper arm directly on the mounting stand.

5. The wiper apparatus as defined in claim 3, wherein said means for pivotally mounting said wiper arm on the mounting stand includes:
   (a) a pivot block disposed inside of said mounting stand;
   (b) means pivotally mounting said wiper arm on one end of said pivot block;
   (c) means pivotally mounting the pivot block on the mounting stand; and,
   (d) biasing means engaged with pivot block for biasing the pivot block about the last mentioned pivot means for normally biasing the wiper arm toward said rear view mirror to maintain the wiper blade in wiping engagement with the mirror.

6. The wiper apparatus as defined in claim 1, wherein:
   (a) said rear view mirror is attached to the vehicle fender by a mounting stand;
   (b) said wiper arm extends down through said mounting stand and fender; and,
   (c) said means for pivotally mounting said rear view mirror wiper arm is disposed inside of said mounting stand.

7. The wiper apparatus as defined in claim 6, wherein said means for pivotally mounting said rear view mirror wiper arm inside of said mounting stand includes:
   (a) a pivot block mounting member secured to the fender inside of said mounting stand;
   (b) a pivot block;
   (c) means pivotally mounting said wiper arm on one end of said pivot block;
   (d) means pivotally mounting the pivot block on the pivot mounting member; and,
   (e) biasing means engaged with said pivot block for biasing the pivot block about the last mentioned pivot means for normally biasing the wiper arm towards said rear view mirror to maintain the wiper blade in wiping engagement with the mirror.

References Cited

UNITED STATES PATENTS

| | | | |
|---|---|---|---|
| 2,913,754 | 11/1959 | Vander Zee | 15—250.3 |
| 2,932,842 | 4/1960 | Riester | 15—250.21 |
| 3,320,627 | 5/1967 | Engel | 15—250.29 |

PETER FELDMAN, *Primary Examiner.*